(12) United States Patent
Märsch

(10) Patent No.: US 12,055,467 B2
(45) Date of Patent: Aug. 6, 2024

(54) DEVICE FOR PREPARING A TISSUE SAMPLE AND PARTICULARLY FOR PRODUCING A WAX BLOCK CONTAINING A TISSUE SAMPLE

(71) Applicant: Leica Biosystems Nussloch GmbH, Nussloch (DE)

(72) Inventor: Thomas Märsch, Munich (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 34 days.

(21) Appl. No.: 16/619,686

(22) PCT Filed: Jul. 24, 2018

(86) PCT No.: PCT/EP2018/070002
§ 371 (c)(1),
(2) Date: Dec. 5, 2019

(87) PCT Pub. No.: WO2019/020607
PCT Pub. Date: Jan. 31, 2019

(65) Prior Publication Data
US 2020/0166439 A1 May 28, 2020

(30) Foreign Application Priority Data
Jul. 25, 2017 (DE) ...................... 10 2017 116 760.9

(51) Int. Cl.
*G01N 1/36* (2006.01)
*G01N 1/31* (2006.01)
(Continued)

(52) U.S. Cl.
CPC ................ *G01N 1/36* (2013.01); *G01N 1/31* (2013.01); *G01N 1/44* (2013.01);
(Continued)

(58) Field of Classification Search
CPC .. G01N 1/36; G01N 1/31; G01N 1/44; G01N 35/00732; G01N 2035/00346; G01N 2035/00742
See application file for complete search history.

(56) References Cited

U.S. PATENT DOCUMENTS 4,978,505 A * 12/1990 Kertz ..................... A01C 1/042
435/286.4
5,358,692 A * 10/1994 Reynolds ................. G01N 1/36
422/561
(Continued)

FOREIGN PATENT DOCUMENTS

EP 0245969 B1 5/1992
JP H08285744 A 11/1996
(Continued)

OTHER PUBLICATIONS

Sakura Finetek USA, Inc., product Literature entitled "Tissue-Tek Paraform Sectionable Cassette System," at least as early as Jul. 24, 2017, Torrence, California, U.S.A.

*Primary Examiner* — Matthew D Krcha
*Assistant Examiner* — Tingchen Shi
(74) *Attorney, Agent, or Firm* — Hodgson Russ LLP

(57) ABSTRACT

The invention relates to an apparatus (1) for producing a wax block containing a tissue sample (1), comprising: a container (4) into which the tissue sample (1) is placed; and a dispensing apparatus (10) for dispensing different substances (8) into the container (4). The apparatus (1) according to the present invention is notable for the fact that it comprises an emptying device (23) for emptying the container (4); and a control unit (22) is provided, which is designed to apply control to the dispensing apparatus (10) and to the emptying device (23) in such a way that in several successive cycles, at least one of the substances is respec-
(Continued)

tively dispensed into the container (4) and the container (4) is emptied again after a specific time period.

11 Claims, 9 Drawing Sheets

(51) Int. Cl.
    *G01N 1/44*     (2006.01)
    *G01N 35/00*     (2006.01)
    *G01N 35/10*     (2006.01)

(52) U.S. Cl.
    CPC ... *G01N 35/00732* (2013.01); *G01N 35/1002* (2013.01); *G01N 2035/00346* (2013.01); *G01N 2035/00742* (2013.01)

(56) References Cited

U.S. PATENT DOCUMENTS

| | | | | |
|---|---|---|---|---|
| 5,576,197 | A * | 11/1996 | Arnold | B01L 3/50825 208/20 |
| 7,156,814 | B1 | 1/2007 | Williamson, IV et al. | |
| 8,383,067 | B2 | 2/2013 | Williamson, IV | |
| 2004/0009098 | A1* | 1/2004 | Torre-Bueno | G01N 1/31 422/63 |
| 2008/0199955 | A1 | 8/2008 | Ulbrich et al. | |
| 2009/0017491 | A1* | 1/2009 | Lemme | G01N 35/0092 435/40.52 |
| 2011/0143393 | A1 | 6/2011 | Merz et al. | |
| 2011/0171088 | A1* | 7/2011 | Takahashi | G01N 1/36 422/536 |
| 2011/0287951 | A1* | 11/2011 | Emmert-Buck | B01L 3/5025 506/7 |
| 2013/0087945 | A1* | 4/2013 | Kusters | G01N 1/36 264/275 |
| 2014/0273085 | A1 | 9/2014 | Eckert et al. | |
| 2015/0160104 | A1* | 6/2015 | Berberich | G01N 1/36 264/279.1 |
| 2015/0253225 | A1* | 9/2015 | Ng | G01N 1/312 422/536 |
| 2015/0260747 | A1* | 9/2015 | Samsoondar | B01D 61/22 422/511 |

FOREIGN PATENT DOCUMENTS

| | | | |
|---|---|---|---|
| JP | 2001124679 A | 5/2001 | |
| WO | 96/29866 A1 | 10/1996 | |
| WO | 2016131859 A1 | 8/2016 | |
| WO | WO-2016131859 A1 * | 8/2016 | ......... A61B 10/0096 |
| WO | WO-2017023666 A1 * | 2/2017 | ............... G01N 1/06 |

* cited by examiner

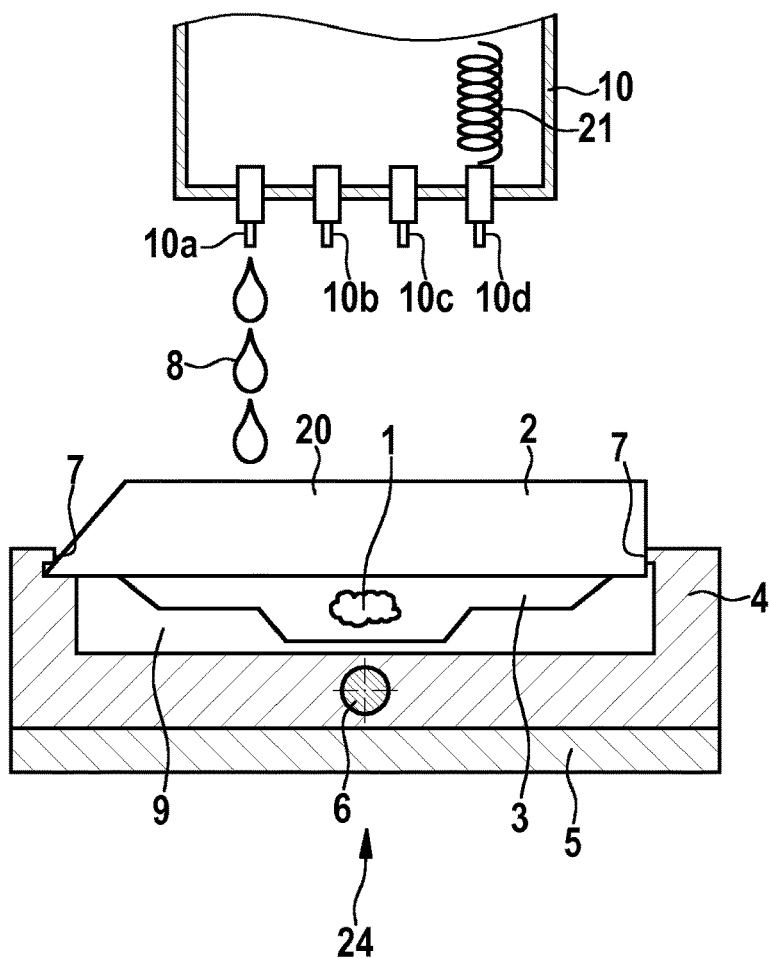
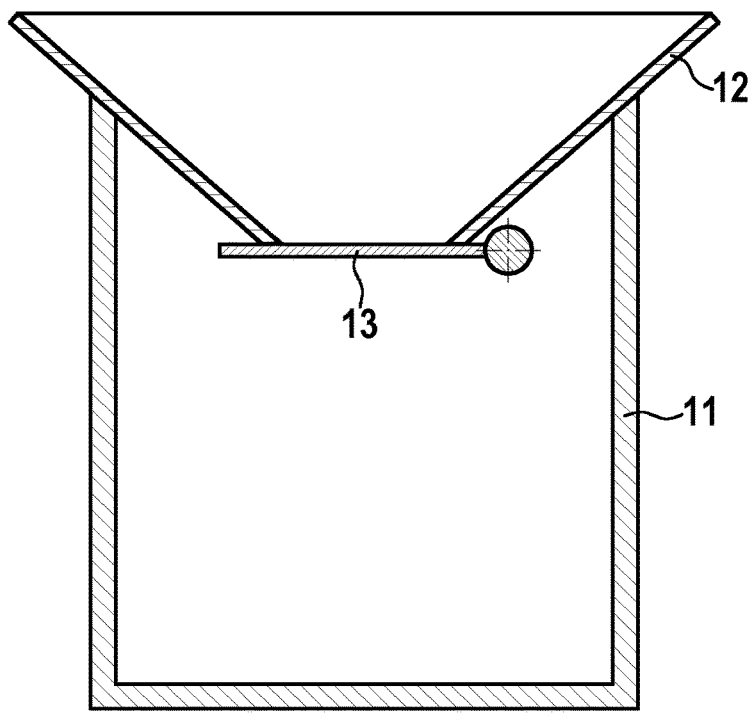
Fig. 3

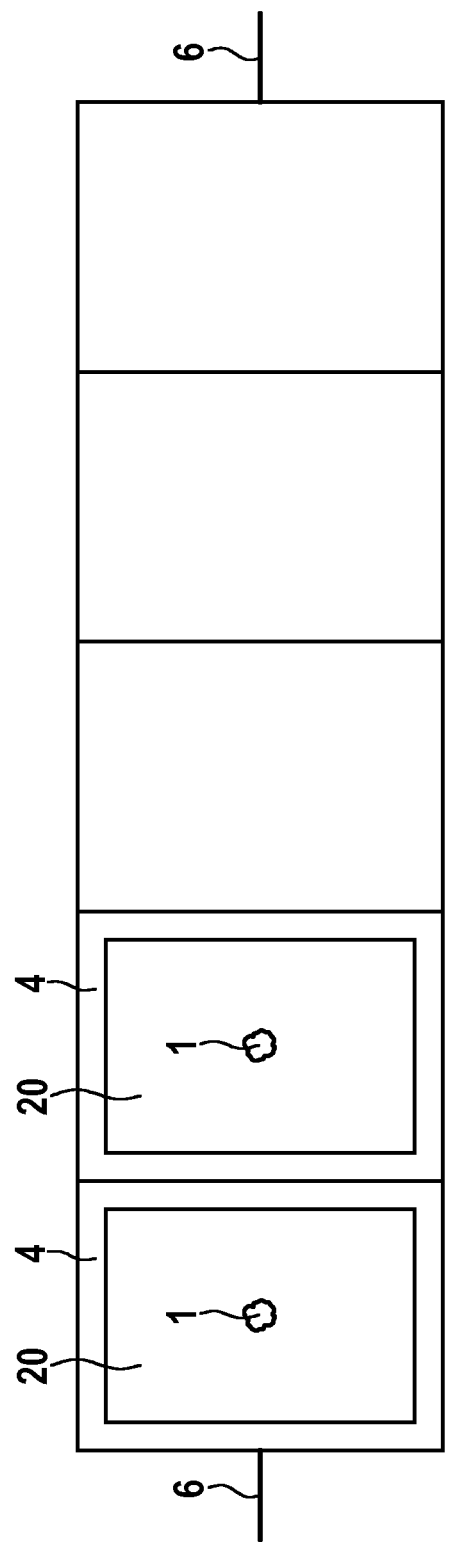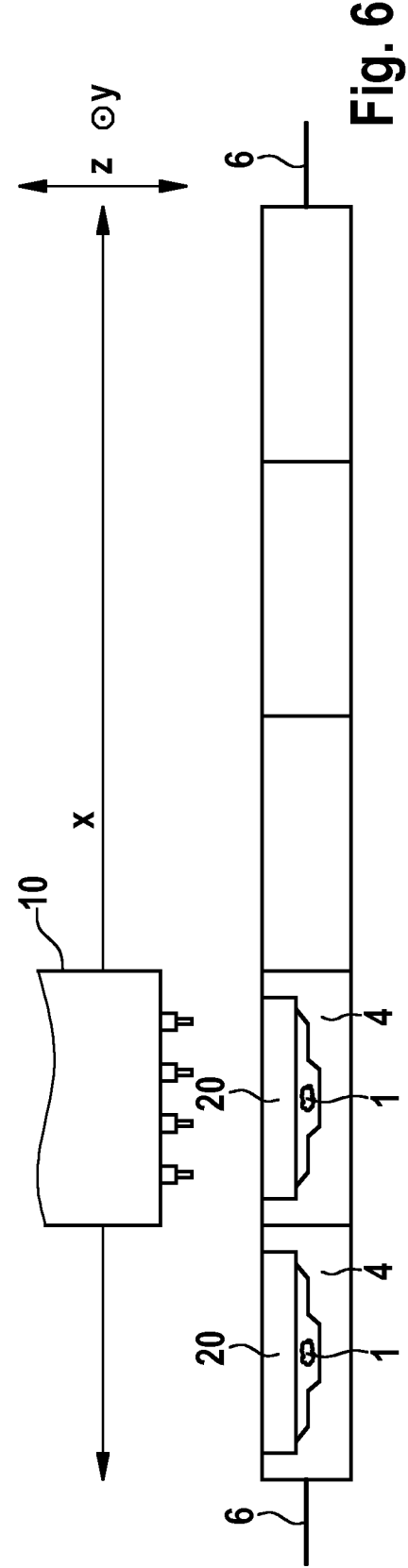

DEVICE FOR PREPARING A TISSUE SAMPLE AND PARTICULARLY FOR PRODUCING A WAX BLOCK CONTAINING A TISSUE SAMPLE

CROSS-REFERENCE TO RELATED APPLICATIONS

The present application is the U.S. national phase of International Application No. PCT/EP2018/070002 filed Jul. 24, 2018, which claims priority of German Application No. 10 2017 116 760.9 filed Jul. 25, 2017, the entire disclosure of which is incorporated herein by reference.

FIELD OF THE INVENTION

The invention relates to an apparatus for processing a tissue sample and in particular for producing a wax block containing a tissue sample, which inter alia prevents cross-contamination between different tissue samples.

BACKGROUND OF THE INVENTION

When certain tissue or cell diseases are suspected, a tissue sample is usually taken from the patient by means of a biopsy. For subsequent microscopic examination, the tissue sample is chemically pretreated, then embedded into a wax block, and then sectioned into thin slices by means of a microtome. The individual slices of the tissue sample can be stained in order to make certain cell types visible. Lastly, the slices are examined with a microscope for possible anomalies or diseases. Sample material can also be removed from the wax block for further investigations such as PCR, sequencing, MALDI-TOF, etc.

The fundamental process of embedding tissue samples into wax blocks has now been in use for more than 100 years. As a rule, automated machines, for example those made by Sakura, Leica, Thermo, etc., are used nowadays to produce such wax blocks.

The following method is generally used to produce a wax tissue block: Firstly a tissue sample is removed via biopsy, and the tissue sample is then introduced into a specimen receptacle containing a fixing solution that protects the tissue from decomposition. The specimen receptacle is then sent to a laboratory, where the tissue sample is removed from the specimen receptacle; placed into a cassette, for example a so-called Paraform® cassette; and then placed into a dehydrator (e.g. of the Sakura company). The dehydrator comprises several baths having different chemicals for dehydrating and processing the tissue sample.

In the dehydrator, the cassette having the tissue sample is immersed successively into the various baths until dehydration of the tissue sample is complete. Alternatively thereto, there are also dehydrators in which the cassettes remain in one chamber and the liquids in the chamber are exchanged via an inflow and outflow system. The cassette having the tissue sample is then placed into a base mold, and hot liquid wax is poured over it. This pouring or "blocking" step can be performed either manually or in a device (for example, of the Sakura company) provided for that purpose, with the aid of sectionable biopsy holders. These are known from the U.S. Pat. No. 7,156,814 B1, U.S. Pat. No. 8,383,067 B2, among others, of Warren P. Williamson et al., and are marketed by the Sakura company under the name "Tissue-Tek® Paraform® cassette system." The wax block produced after cooling is sectioned with a microtome into thin slices that are then examined microscopically.

This method, known from the existing art, for producing a wax block containing a tissue sample requires that the tissue sample be firstly sent to a laboratory, dehydrated and processed in a dehydrator, and lastly impregnated with wax in a base mold in order to produce the wax block. A substantial disadvantage of the dehydrator used in this context is that tissue carryover or cross-contamination between different tissue samples can occur upon successive immersion of the tissue sample into the individual baths, specifically if tissue portions detach from a tissue sample upon immersion into a treatment bath and then, upon immersion of the next tissue sample, adhere in turn to the next tissue sample. In addition, it is not possible to develop an individual dehydration protocol for each sample, although this would be advantageous for different tissue types and sample types. It is furthermore necessary to remove the dehydrated tissue sample from the dehydrator and place it into a base mold in order to produce the wax block. This is relatively laborious.

OBJECT AND SUMMARY OF THE INVENTION

An object of the present invention is therefore to create an apparatus and a method for processing a tissue sample and in particular for producing a wax block containing a tissue sample, in which cross-contamination between different tissue samples is substantially ruled out and which can be handled in simple and reliable fashion.

This object is achieved according to the invention by the features indicated in the independent claims. Further embodiments of the invention may be gathered from the dependent claims.

The invention proposes an apparatus for processing a tissue sample which comprises one or several chambers or containers (hereinafter "containers"), into each of which exactly one tissue sample is placed; and which furthermore comprises a dispensing apparatus for dispensing various substances into the containers. The apparatus can contain several such containers. The container or containers are preferably each designed to receive only a single tissue sample. The apparatus according to the present invention is furthermore notable for the fact that it comprises an emptying device for emptying the container; and that a control unit is provided which applies control to the dispensing apparatus and to the emptying device in such a way that in several successive cycles, at least one of the substances is respectively dispensed into the container and the container is emptied again after a specific time period. The apparatus according to the present invention therefore performs the dispensing and emptying steps at least twice in succession. The tissue sample meanwhile preferably remains in the container or at least is not transferred into another container. The capacity of the device can be increased by the fact that several of these containers are arranged next to, but separately from, one another. Cross-contamination between different tissue samples is thus substantially ruled out.

The tissue sample either can be placed directly into the container, or it can first be placed into a cassette that is then placed into the container. In embodiments in which the tissue sample is placed directly into the container, a cover or partition that covers a chamber in which the tissue sample is located is preferably provided. An immobilizing element, with which the tissue sample can be immobilized in the chamber, can also be provided. The immobilizing element is preferably made of an elastic material and can be, for example, a sponge that presses onto the tissue sample from above.

According to a special embodiment, the apparatus according to the present invention for processing a tissue sample can contain a camera that can read data, in particular barcodes, present on the cassettes, and conveys them to the control unit. Individual execution protocols can then be executed by the control unit as a function of the sample information contained in the barcodes. These process data can furthermore be forwarded to a higher-order IT system, for example a laboratory information system.

According to an embodiment of the invention, the emptying device can be implemented, for example, as a tilting device for automatically tilting the container. In this case the container or containers is/are preferably mounted tiltably. The tilting device for the container or containers is preferably controlled in such a way that the container or containers is/are emptied after each treatment bath. Each container is then filled with the next substance.

Alternatively, the emptying device can also be implemented as a closure device for automatically opening or closing the container. In the simplest case, an opening that is automatically opened or closed with the aid of a closure can be provided in the base of the container. According to another embodiment of the invention, a portion of the container can also be embodied movably in order to open or close the container.

According to a further embodiment of the invention, the emptying device can also be implemented as an aspiration device for automatic aspiration of the substance contained in the container. The emptying device can comprise for that purpose, for example, a suction tube or the like which is immersed from above into the container or containers.

Emptying of a container can also be achieved in principle by evaporation of the liquid contained in the container. In a corresponding embodiment in which the liquid contained in the container is evaporated, a heating apparatus is preferably provided. In this case the heating apparatus functions as the emptying apparatus and is preferably designed so that the liquid contained in the container evaporates partly or entirely within a desired time. The heating apparatus can be arranged, for example, directly on the container or in the vicinity of the container. For example, it can be arranged below the container or can be integrated into the container. The heating apparatus can involve any technology known in the existing art, for example an electrical heating apparatus having a heating coil. In principle, the heating apparatus can be associated with a single container or with several. The aforementioned emptying device would in this case be understood as the heating apparatus with the associated control unit.

If permitted by process conditions, a heating apparatus could also be omitted. In this case the substance present in the container would evaporate by itself at a predefined evaporation rate that depends, among other factors, on the temperature and the boiling point of the liquid. It would then merely be necessary to wait somewhat longer until the next substance can be dispensed in. The aforesaid emptying device would be understood in this case as a control unit that is capable of calculating the evaporation process or ascertaining the remaining quantity of substance present in the container, and correspondingly determining a point in time for introducing the next substance.

In the context of producing a wax block utilizing the evaporation technique, a substance present in the container can be either completely or partly evaporated by the time the next substance is added. According to a preferred embodiment, the next substance is already dispensed in when a residue of the previous liquid is still present in the container. This residue of the previous liquid will evaporate further, at least in part, in the subsequent process. The correct point in time for introducing the new substance either can be calculated or can be measured by means of a sensor, e.g. by weighing.

According to a further embodiment of the invention it is also possible to empty a container by adding a new liquid, by the fact that the container is overfilled. When enough new liquid has been dispensed in, the container overflows and the liquid hitherto present in the container is displaced, or at least sufficiently diluted, by the newly dispensed-in liquid. According to a corresponding further embodiment of the invention, in this case the evaluation device comprises a dispensing apparatus having a control unit which dispenses a new liquid into the container until the previous liquid has been substantially completely or sufficiently rinsed out. The overflowing liquid is preferably collected in a container and, if applicable, can be evaporated or otherwise disposed of. The dispensing apparatus is preferably the same apparatus that was described previously.

The tissue sample preferably remains in the same container during the entire dehydration process, if applicable until the tissue wax block is completed.

The apparatus according to the present invention preferably comprises a waste container that receives the substances flowing out of the container. The waste container is preferably arranged directly below the container or containers, so that the substances flowing out of the container drop directly into the waste container.

The waste container preferably comprises a closable cover that serves principally to keep unpleasant odors away. The cover is preferably actuated automatically. A closing apparatus for automatically opening and closing the cover can be provided, for example, for this purpose. The closing apparatus can comprise, for example, an electromagnet to which control is applied by the control unit.

The container is preferably dimensioned to be sufficiently large that the tissue sample, together with a cassette in which the tissue sample is located, can be accommodated therein. In order to prevent the cassette having the tissue sample from falling out when the container is emptied, for example if the container is tilted upside down, the container preferably comprises suitable holding means which prevent the cassette from falling out. In the simplest case, suitable holding means can be a depression on the base of the container into which the cassette can be at least partly inserted. Alternatively or additionally, latching means, positive engagement means, or other holding means known from the existing art can also be provided.

According to a preferred embodiment of the invention, the apparatus for processing a tissue sample is designed both to dehydrate the tissue sample and to produce a tissue wax block (hereinafter a "wax block"). In this case the wax block is preferably produced in the same container in which the tissue sample was previously dehydrated. This offers the advantage that the tissue sample does not need to be transferred into another receptacle, and that the entire production method can occur within one device.

According to a preferred embodiment of the invention, the container comprises a heating apparatus. The wax present in the container can thus be kept liquid until it has penetrated completely into the tissue sample. The heating apparatus is preferably integrated into a base of the container, but can also be provided at a different location. The heating apparatus is preferably switched on before wax is introduced into the container and is switched off again after a predetermined time, with the result that the wax cools and forms a wax block in which the tissue sample is located.

The dispensing apparatus according to the present invention preferably comprises several dispensing vessels that each contain a specific substance for chemical treatment of the tissue sample, and optionally also wax for producing the wax block. The dispensing apparatus furthermore comprises one or several drive units for actuating the dispensing vessels. A small quantity of the substance present in the dispensing vessels can thus be respectively dispensed into the container.

Delivery conduits, for example hoses, can be provided, for example, in order to convey the individual substances from the dispensing vessels into the container. According to a preferred embodiment of the invention, however, the dispensing apparatus is designed so that the substances discharged from the dispensing vessels drop down directly into the container present therebelow. In this case the dispensing apparatus is arranged directly above the container or can be brought into a corresponding position.

The individual dispensing vessels are preferably integrated into one common cartridge. The cartridge can thus be introduced into and removed from the apparatus as a physical unit.

At least one of the dispensing vessels preferably comprises wax for producing the wax block. This dispensing vessel preferably comprises a heating apparatus in order to prevent the wax from hardening. In the simplest case, a heating coil can be provided as a heating apparatus. Other heating apparatuses are well known from the existing art.

According to a preferred embodiment of the invention, the apparatus comprises several containers for receiving tissue samples, thereby making it possible to treat several tissue samples simultaneously. All the containers are preferably integrated into one common container unit.

The individual containers can be filled successively, or optionally also simultaneously, with the requisite chemical substances. In the first case the dispensing apparatus can comprise a dispensing unit that is arranged movably and is moved successively from one container to the next. In the second case each container can also have a separate dispensing unit associated with it, so that the containers can be filled simultaneously.

The emptying device is preferably designed in such a way that all the containers can be emptied simultaneously or substantially simultaneously. According to a first embodiment, all the containers are integrated into one container unit that is arranged tiltably as a whole. According to a second embodiment, each container can comprise a closure device for opening and closing an opening through which the liquid present in the container can be drained. The individual closure devices preferably have control applied to them simultaneously.

The container or containers can be dimensioned so that a respective cassette can be inserted only on edge, but not horizontally, into the container.

A control unit as commonly known from the existing art is preferably provided in order to control the dispensing apparatus, the emptying device and, if applicable, the cover of the waste container.

The individual process steps can be speeded up using methods known from the existing art. These include, among others, vacuum, microwaves, ultrasound, agitation, pressure, etc.

The present invention also relates to a method for processing a tissue sample, the tissue sample either being placed directly into a container or firstly into a cassette and the cassette then being placed into the container in which the tissue sample is treated. According to the invention, only a single tissue sample is introduced for each container, in order to avoid cross-contamination between different tissue samples. After introduction of the tissue sample, the following steps are then respectively executed, in several successive cycles, in order to treat the tissue sample:

dispensing at least one chemical substance into the container (4); and emptying the container (4).

BRIEF DESCRIPTION OF THE DRAWINGS

The invention will be explained in further detail below, by way of example, with reference to the attached drawings, in which:

FIG. 3 is a schematic view of an apparatus for processing a tissue sample, in accordance with an embodiment of the invention;

FIG. 5 is a side view of a container unit having several containers that are mounted tiltably collectively around an axis;

FIG. 6 is a side view of a container unit having several containers, and of a dispensing apparatus arranged thereabove which is displaceable in a horizontal and a vertical direction;

FIG. 11b shows the same container as FIG. 11a, wherein the liquid level of the chemical liquid is lower than in FIG. 11a;

DETAILED DESCRIPTION OF PREFERRED EMBODIMENTS

Figure 1:
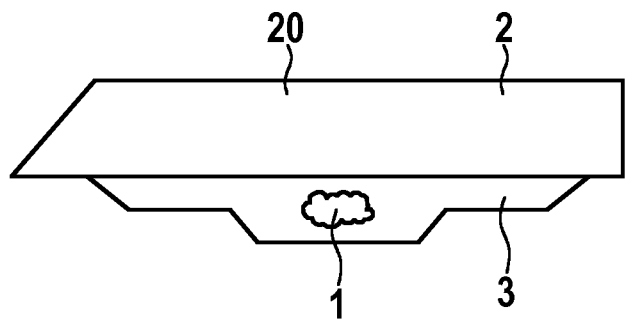
FIG. 1 is a side view of a Paraform cassette having a tissue sample placed therein.

FIG. 1 is a side view of a cassette 20 having a tissue sample 1 placed thereinto. Cassette 20 can be, for example, a so-called Paraform® cassette that substantially comprises a cassette frame 2 and a replaceable base inlay or tissue holder 3 in which tissue sample 1 is arranged. Optionally, however, any other commercially usual cassette 20 can be used. In the method described below, cassette 20 is embedded into a wax block and sectioned into thin slices together with tissue sample 1 present therein. Lastly, the slices can be investigated with the aid of a microscope for possible anomalies or diseases.

Figure 2:
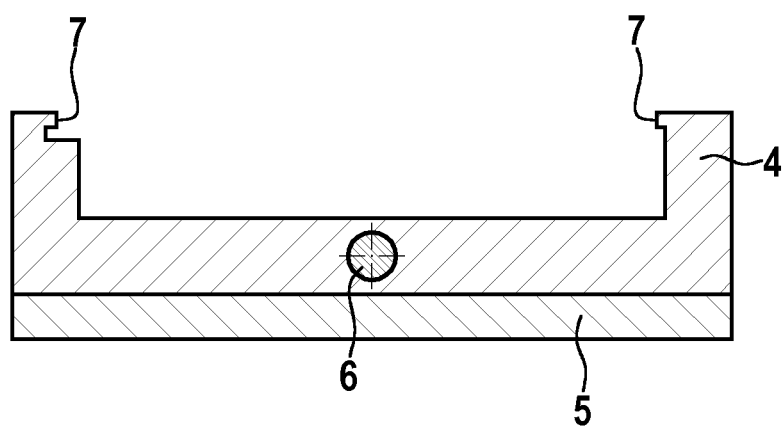
FIG. 2 is a side view of a container having a heated base, for receiving the cassette of FIG. 1.

FIG. 2 is a side view of a container 4 having a heated base 5 for receiving cassette 20 of FIG. 1. In this embodiment, container 4 comprises a shaft 6 around which it can be pivoted. A liquid present in container 4 can thus easily be tipped out.

In order to prevent cassette 20 having tissue sample 1 from falling out when container 4 is emptied, for example if the container is tipped upside down, container 4 comprises holding means that prevent the cassette from falling out. In the exemplifying embodiment depicted, the holding means are embodied as latching means 7, in particular as latching protrusions. Alternatively or additionally, other holding means known from the existing art can also be provided.

FIG. 3 is a schematic view of an apparatus for processing a tissue sample 1, in accordance with an embodiment of the invention. The apparatus that is depicted serves to dehydrate tissue sample 1 and, if applicable, also to produce a tissue wax block 27 that is depicted by way of example in FIG. 10. Dehydration of tissue sample 1 is accomplished as a rule in several successive steps. Once tissue sample 1 has been dehydrated, wax block 27 is then produced in a final working step.

Visible at the center of FIG. 3 is a container 4 having, inserted thereinto, a cassette 20 in which tissue sample 1 is located. Container 4 is mounted pivotably around a shaft 6. Located above container 4 is a dispensing apparatus 10 that comprises several dispensing vessels 10a to 10d. In the exemplifying embodiment depicted, only the exit nozzles of dispensing vessels 10a to 10d are visible.

The individual vessels 10a to 10d each contain a chemical substance for dehydrating tissue sample 1; dispensing vessel 10d furthermore contains liquid wax for producing a wax block 27.

Each dispensing vessel 10a to 10d can have a separate drive unit (not shown) associated with it, for actuation of the respective dispensing vessel 10a to 10d. The individual drive units have control applied to them by a control unit 22, either each individually or, as applicable, several dispensing vessels 10a to 10d simultaneously, with the result that they deliver a specific quantity of the substance contained therein.

In the exemplifying embodiment depicted, dispensing container 10a is being actuated, with the result that chemical substance 8 contained therein emerges dropwise and falls into container 4 arranged directly below.

As already mentioned, dispensing vessels 10a to 10c each contain a chemical liquid for dehydrating tissue sample 1. Dispensing vessel 10d, conversely, contains wax for producing wax block 27. A heating apparatus 21, which heats the wax, is provided In order to melt the wax contained in dispensing vessel 10d or to keep it in the liquid state.

Figure 10:
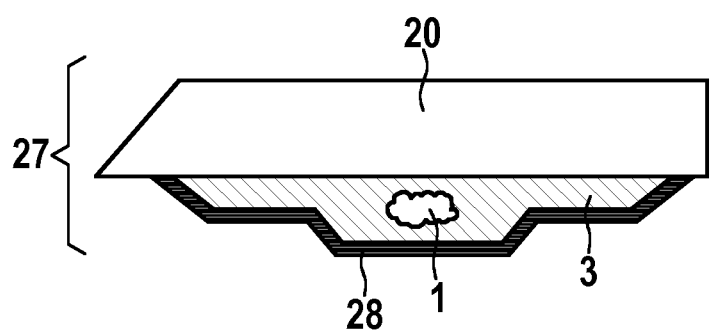
FIG. 10 schematically depicts a tissue wax block.

As mentioned, container 4 for receiving tissue sample 1 likewise comprises a heating apparatus 31 integrated into base 5. With the aid of heating apparatus 31, the wax present in container 4 is kept liquid until it has completely infiltrated into tissue sample 1. Heating apparatus 31 is then switched off, with the result that the wax cools and solidifies into a wax block 27, as illustrated in FIG. 10.

A tilting device for tilting container 4 is labeled schematically with the reference character 24. Tilting device 24 is a first variant embodiment of a general emptying device 23 for emptying container 4. It can comprise, for example, an electrical drive system that actuates a lever provided on container 4, with the result that container 4 pivots around shaft 6.

A waste container 11 having a closable cover 13 is located below container 4. Container 4 is preferably emptied several times, by tilting container 4, during the production of tissue wax block 27. The liquids flowing out of container 4 then land in waste container 11 arranged below, and are collected there. A closing apparatus for cover 13 controls the opening and closing of cover 13. For emptying, container 4 is tilted preferably at least 90 degrees and in particular at least 120 degrees.

The following method, for example, can be carried out in order to produce a tissue wax block 27 with the aid of an apparatus according to the present invention: Once a tissue sample 1 has been taken, it is placed into a cassette 20 that is then introduced into container 4 of the apparatus. The entire production process for the block can be carried out, if applicable, at the location where the tissue is sampled.

If necessary, a cartridge having several dispensing vessels 10a to 10d in which the chemicals necessary for production are contained, is placed into dispensing apparatus 10. The apparatus is then started via a start button, with the result that various working steps are executed in succession. In a first step, first dispensing vessel 10a, which is filled e.g. with an aqueous formalin solution (for example, 10% formalin), is actuated. As a result, the formalin solution is expelled from dispensing vessel 10a and runs into container 4, arranged therebelow, having tissue sample 1 present therein. A delay time of, for example, 30 minutes then follows. Container 4 is then tilted, for example, 90 degrees or more with the result that the liquid present therein flows out of container 4 into waste container 11 present therebelow. Cover 13 of waste container 11 is, in this context, automatically opened, for instance with the aid of an electromagnet, and closed again after a predefined period of time.

In a second step, second dispensing vessel 10b, which is filled e.g. with ethanol, is then actuated, with the result that the liquid ethanol is expelled from dispensing vessel 10b and flows into container 4, arranged therebelow, having tissue sample 1 present therein. A delay time of, for example, 30 minutes, in which the liquid ethanol acts, then follows.

Once the delay time has elapsed, container 4 is tilted again so that the liquid present therein flows out and drops into waste container 11 present therebelow. Cover 13 of waste container 11 is once again opened by means of the closing apparatus, and closed again after a predefined time.

In a third working phase, third dispensing vessel 10c, which is filled e.g. with xylene or a xylene substitute, is actuated. As a result, a corresponding quantity of the liquid emerges from dispensing vessel 10c and flows into container 4, arranged therebelow, having tissue sample 1 present therein. This is then followed by a delay time of, for example, 30 minutes in which the liquid can penetrate into tissue sample 1.

Once the delay time has elapsed, container 4 is once again tilted, with the result that the liquid runs out of container 4 and flows into waste container 11 located therebelow. Cover 13 of waste container 11 is once again opened with the aid of the closing apparatus, and closed again after a predefined time. The procedure for dehydrating tissue sample 1 is thereby complete.

Heating apparatus 21 is then heated to approximately 70° C. in order to heat up dispensing vessel 10d. The result is that the wax contained in dispensing vessel 10d becomes liquid so that it can be dispensed.

In a fourth working phase, control is then applied to fourth dispensing vessel 10*d*, which is filled with liquid wax (paraffin). The result is that the correct quantity of liquid wax is forced out of dispensing vessel 10*d* and flows into container 4, arranged therebelow, in which tissue sample 1 is located. A delay time of, for example, 30 minutes, in which the wax can penetrate into tissue sample 1, then follows. The heating apparatus arranged in container 4 is also heated up.

The individual dispensing and emptying steps described here by way of example can also each be carried out several times in succession, for example in order to obtain a rinsing effect or to deliver chemicals.

Once the delay time has elapsed, the two heating apparatuses are switched off and a cooling system (not shown), for example a ventilation system, is switched on, with the result that the wax present in container 4 solidifies into a wax block 27. After a predefined period of time has elapsed, for example, a green LED lights up and signals to the user that tissue wax block 27 is now complete and can be removed.

Figure 4:
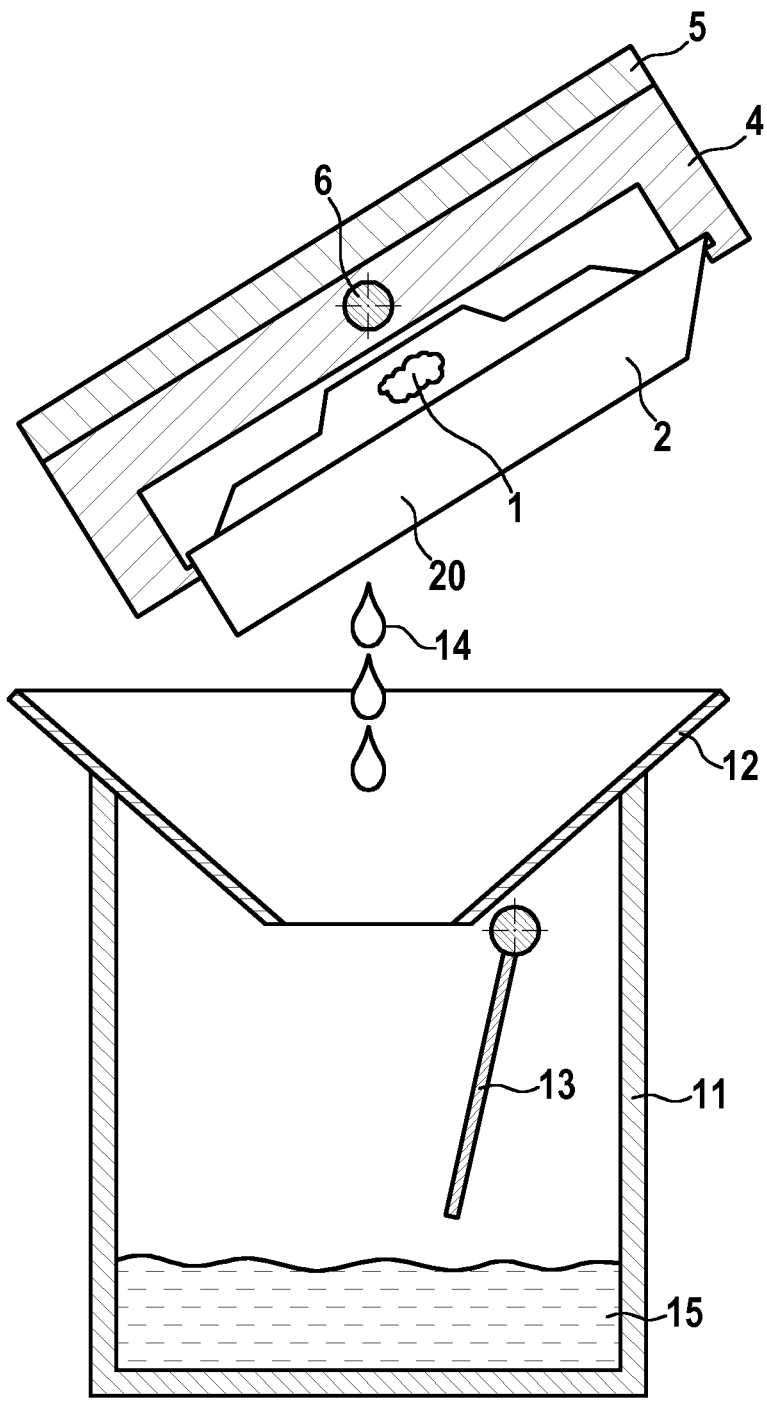
FIG. 4 is a view of the container of FIG. 2 in an upside-down tilted state, and of a waste container arranged below the container.

FIG. 4 shows the apparatus for processing a tissue sample 1 of FIG. 3, in a state in which container 4 is tipped upside down. The liquid contained in container 4 flows out of container 4 and drops directly into waste container 11 located therebelow (see droplets 14). Waste container 11 has a collection funnel 12 at its top end in order to prevent liquid from dripping along said container. Cover 13 is has been opened, and will be closed again after the liquid is tipped out. The liquid collected in waste container 11 is labeled with the reference character 15.

FIG. 5 is a view from above of a container unit having several containers 4 into each of which a cassette 20 having a tissue sample 1 is placed. The container unit is pivotable as a whole around a shaft 6. The advantage of such a container unit is that all the containers 4 can be emptied simultaneously.

FIG. 6 is a side view of a container unit having several containers 4 and a dispensing apparatus 10 that is arranged thereabove and is displaceable in a horizontal plane (X, Y directions) and in a vertical direction (Z). A pertinent drive unit for dispensing apparatus 10 is not depicted.

Figure 7A:
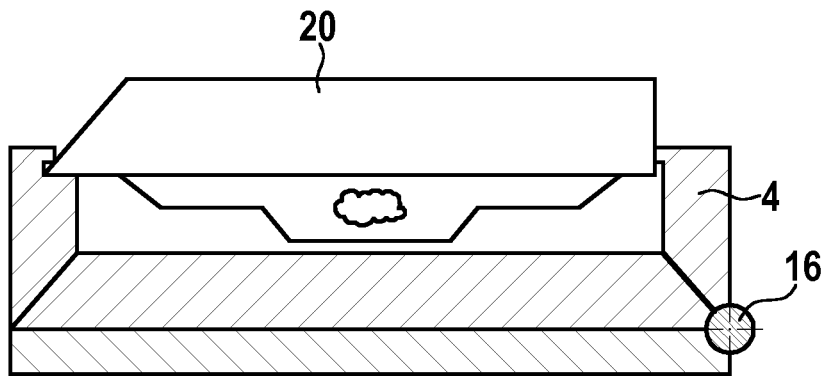
FIGS. 7a, 7b are various views of a container having a movable container base that can be opened or closed.
Figure 7B:
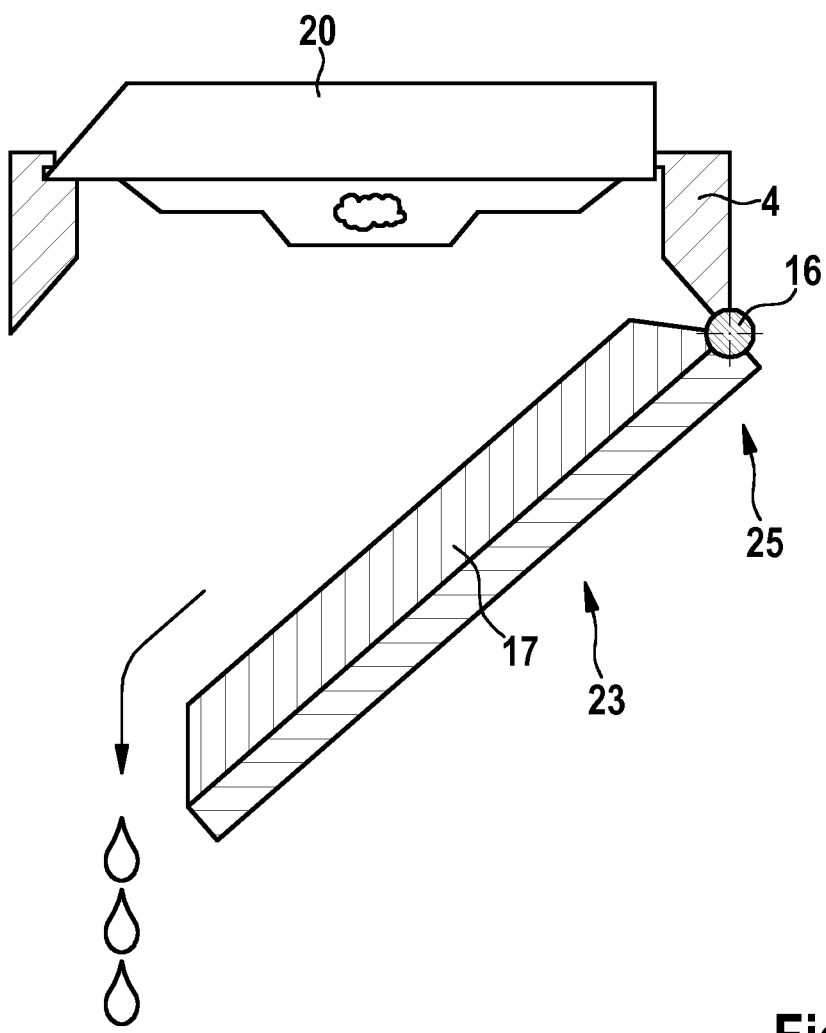

FIGS. 7*a* and 7*b* are different views of a container 4 having a second variant of emptying device 23. In the example depicted, emptying device 23 comprises a movable container base 17 that is mounted pivotably via a pivot joint 16 and can be opened or closed in order to empty container 4. This mechanism is one possible embodiment of a closure device 25 for automatically opening or closing container 4. Container 4 is furthermore designed so that cassette 20 does not fall out when container base 17 is opened. Suitable projections or latching means, for example, can be provided for this purpose.

Figure 8A:
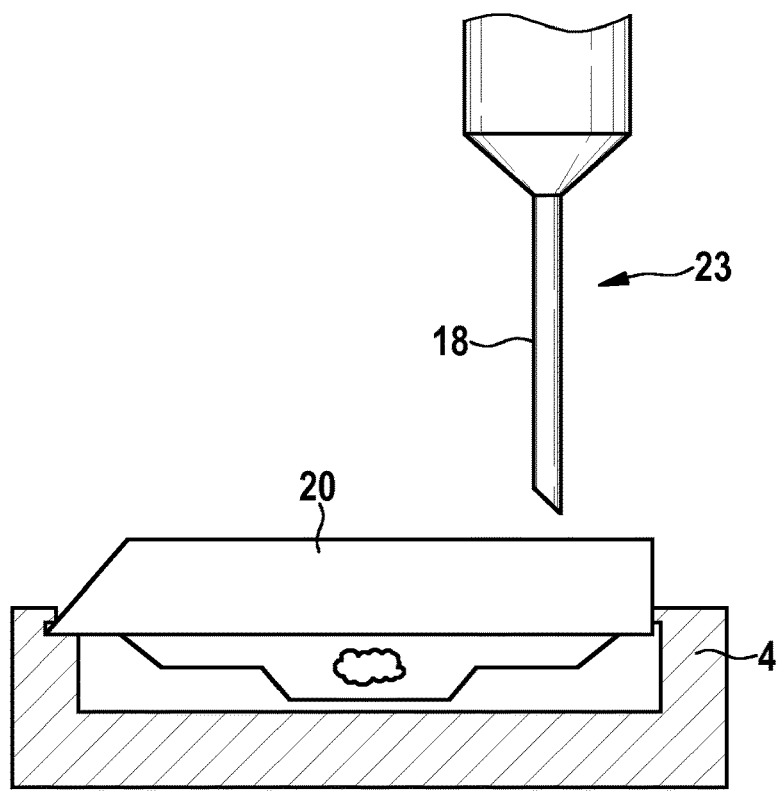
FIGS. 8a, 8b are various views of a container having an aspiration device for aspirating the liquid present in the container.
Figure 8B:
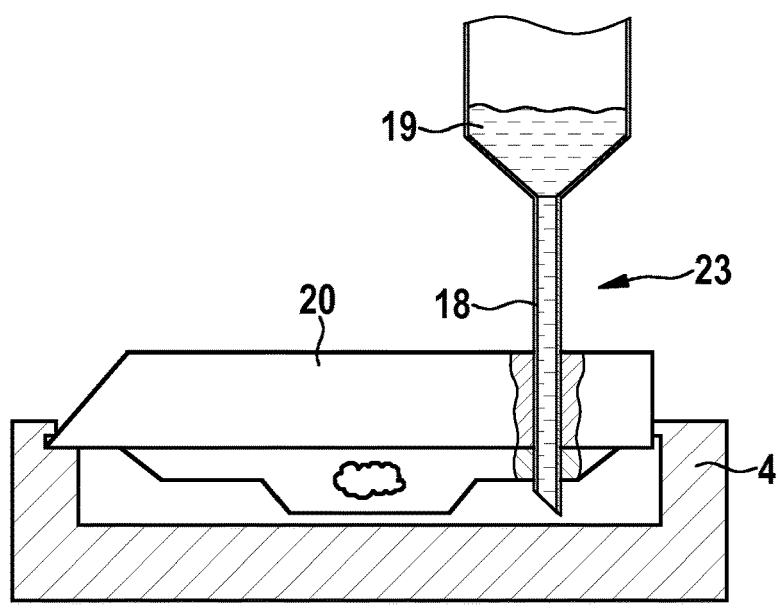

FIGS. 8*a* and 8*b* are various views of a container 4 having an aspiration device 18 for aspirating the liquid present in container 4. Aspiration device 18 is a further possibility for a general emptying device 23 for emptying container 4. FIG. 8*a* shows a state in which aspiration device 18 is arranged above container 4, and FIG. 8*b* a state in which aspiration device 18 is immersed into container 4 and is aspirating liquid. The aspirated liquid is labeled with the reference character 19.

Figure 9:
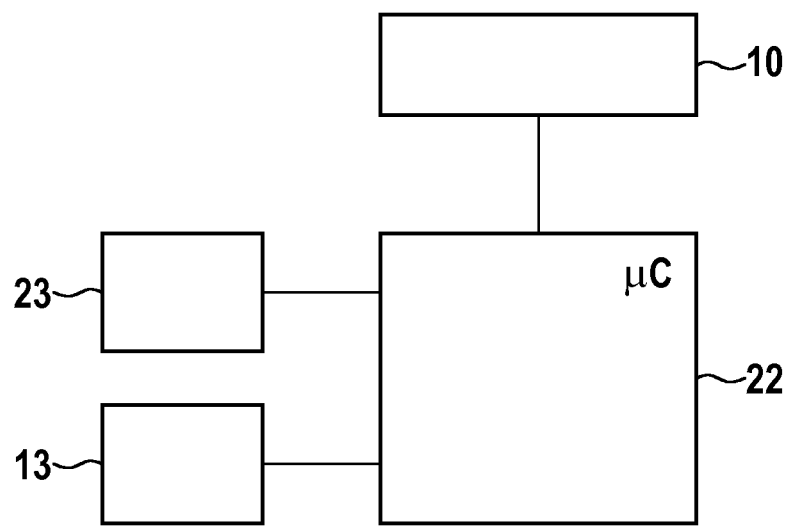
FIG. 9 is a schematic view of the electronic controller pertaining to the apparatus according to the present invention.

FIG. 9 is a schematic view of electronic control unit 22 pertinent to the apparatus according to the present invention. As is evident, control unit 22 is connected to dispensing apparatus 10, to emptying device 23, and to the drive system of cover 13 of waste container 11, and optionally also to a heating apparatus 31, and is capable of applying control to those units according to user stipulations. The process sequence for producing a tissue wax block 27 can be adjusted in user-specific fashion by means of a software application. The user can perform his or her desired settings on an input unit (not shown).

FIG. 10 schematically depicts a tissue wax block 27 having an enclosed sectionable Paraform tissue holder 3 and a thin wax layer 28 adjacent thereto. Wax layer 28 is produced between tissue holder 3 and container 4, which also serves as a base mold in the last process step. As is evident from the stepped profile of wax layer 28, in this case a container 4 having a corresponding step-shaped base contour was used.

Figure 11A:
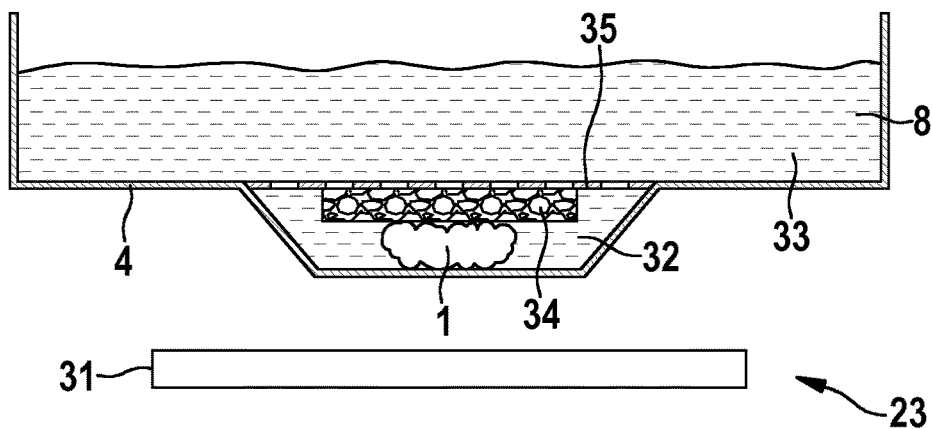
FIG. 11a is a simplified side view of the container having tissue sample 1 wherein the container is filled with a chemical liquid.
Figure 11B:
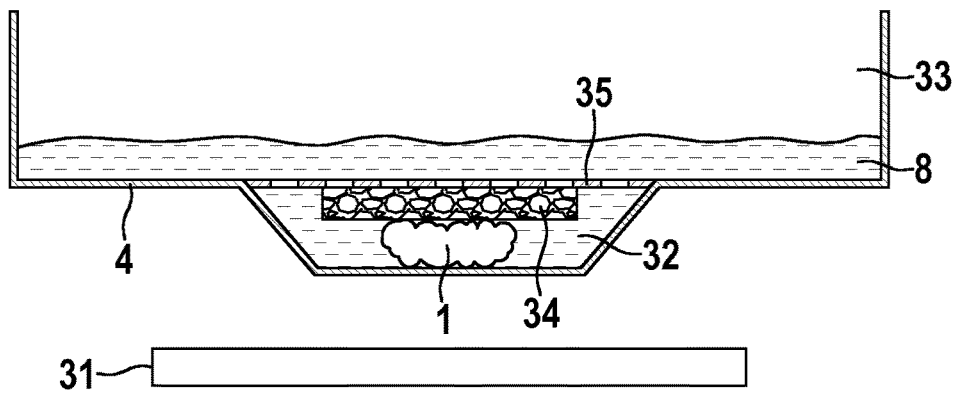
Figure 11C:
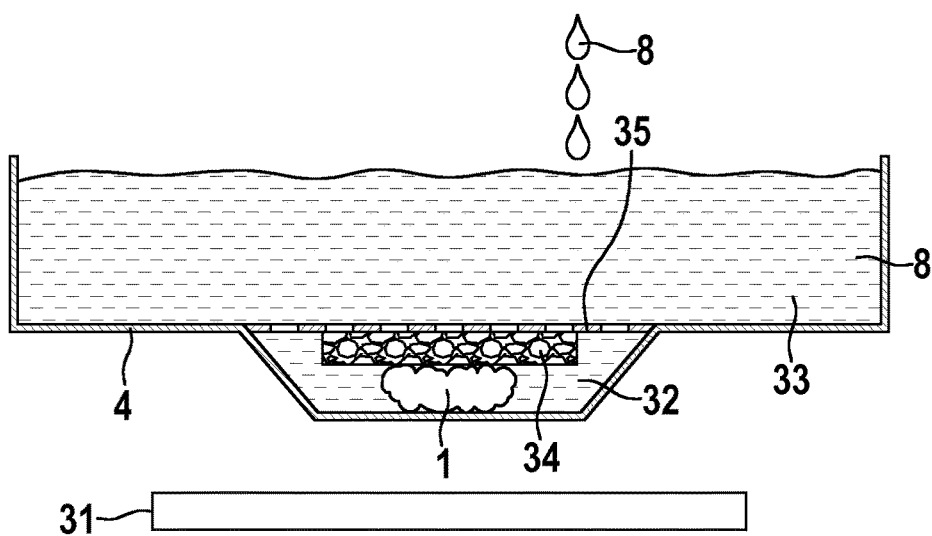
FIG. 11c shows the same container as FIG. 11a, wherein a further liquid is being introduced into the container.

FIGS. 11*a* to 11*c* show various states of a container 4 in the context of a special method for producing a tissue wax block 27 in which container 4 is heated so that the liquid contained therein evaporates. A heating apparatus 31, with which substance 8 present in container 4 can be heated, is provided for this purpose below container 4. Heating apparatus 31, together with a pertinent control unit 22, constitutes in this case a variant of emptying device 23 recited earlier.

In this exemplifying embodiment, container 4 is embodied in a trough shape and comprises a first chamber 32 that is embodied at the base of trough-shaped container 4, as well as a second chamber 33, located thereabove, which has a larger volume than first chamber 32. Container 4 furthermore contains a partition 35 that physically separates first and second chambers 32, 33 from one another, the partition having at least one opening through which a fluid exchange can take place between the two chambers 32, 33. Tissue sample 1 is arranged in first chamber 32 and is immobilized therein by way of a sponge 34 or the like.

Partition 35 can be embodied, for example, as a cover, so that first chamber 32 can be opened or closed. Partition 35, or the opening that can be closed off therewith, is in this case preferably dimensioned so that a tissue sample 1 can be placed from above, through second chamber 33, into first chamber 32.

In FIG. 11*a*, container 4 is filled almost to the top edge with a substance 8 or liquid. Control unit 22 applies control to heating apparatus 31 in such a way that the liquid contained in container or containers 4 evaporates at the desired speed. The evaporation rate can be adjusted, for example, by way of the heating output. In FIG. 11*b* the liquid level has already dropped approximately by half.

After a specific delay time, the next substance 8 is dispensed into container 4 or cassette 20, preferably in a state in which residual liquid is still present in container 4 (see FIGS. 11*b*, *c*). The residue of the previous liquid will then be further vaporized in the next process. Because the evaporation process is a controlled one with known parameters, the correct point in time for refilling can be calculated quite well. Optionally, the correct moment for adding the new substance 8 can also be measured by means of a sensor, e.g. by weighing.

Because the boiling points of the chemicals or substances 8 used in the process increase from one step to the next, it would in fact be possible to do without an additional heating apparatus 31. In this case, first substance 8 would be introduced and there would then be a certain delay until the quantity of the first substance 8 that is present is only so much that the next substance 8 can be dispensed after it. The delay time depends, among other factors, on the temperature and the boiling point of the respective substance 8. After the delay time, the amount of residual liquid that is present is so small that it completely, or at least almost completely, vaporizes in the subsequent process. Once again, the correct point in time for topping up either can be calculated or can be measured by means of a sensor.

Figure 12A:
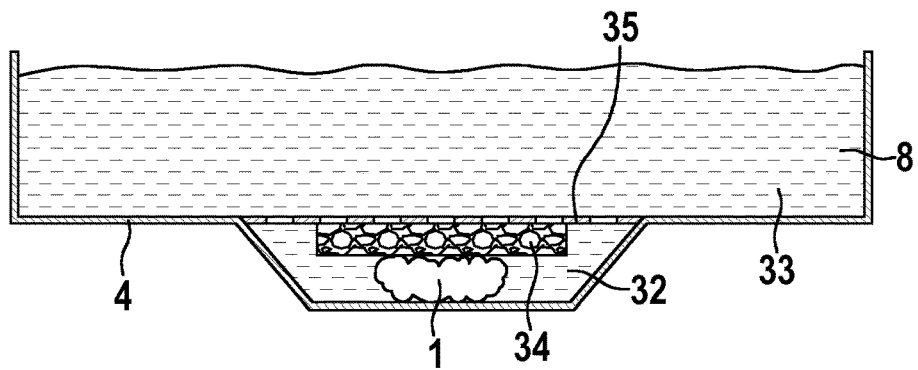
FIG. 12a shows the same container as FIG. 11a, wherein the container is being filled with a chemical liquid.
Figure 12B:
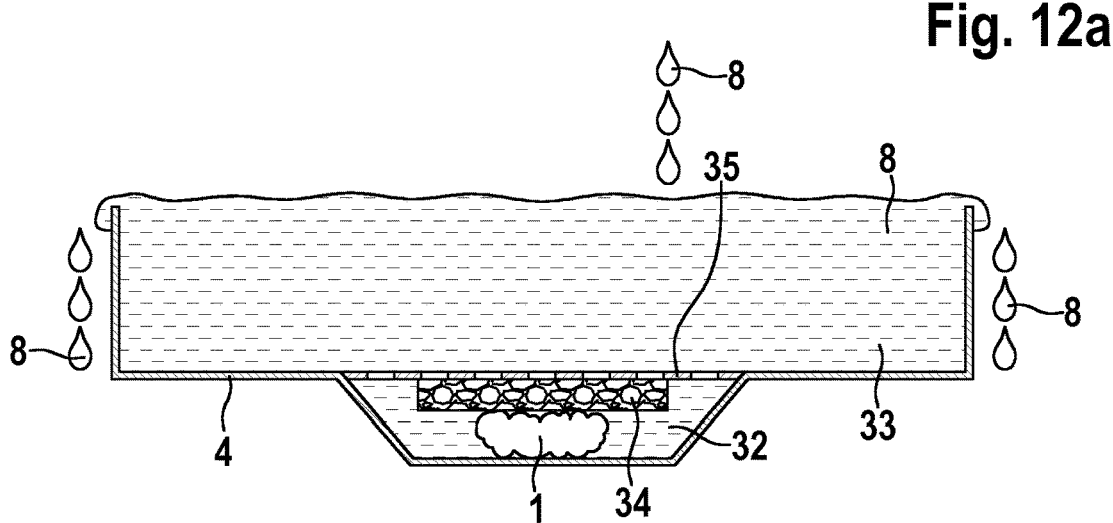
FIG. 12b shows the same container as FIG. 12a, wherein a further liquid is being introduced and the container is overflowing.
Figure 12C:
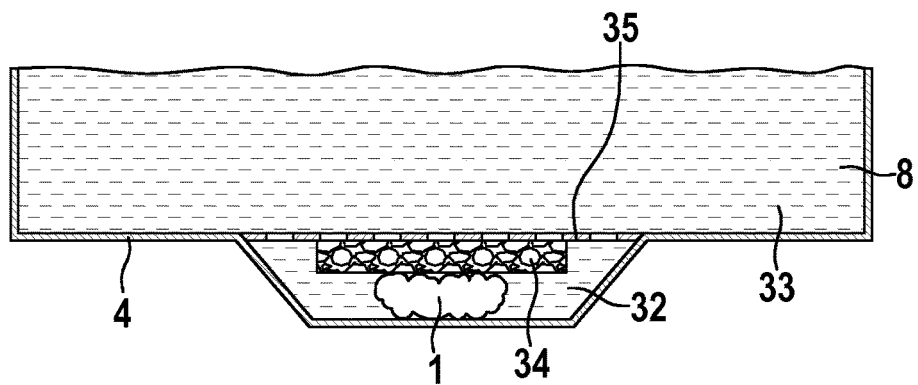
FIG. 12c shows the same container as FIG. 12b; the second liquid has very largely displaced or replaced the first liquid via overflow.

FIGS. 12a to 12c show various states of a container 4 in the context of a method for producing a tissue wax block 27 in which container 4 is overfilled by adding a new liquid. When sufficient new liquid has been dispensed in, container 4 overflows and the liquid hitherto present in container 4 is displaced, or at least sufficiently diluted, by the new liquid dispensed in. In this case control unit 22 applies control to dispensing apparatus 10 in such a way that the latter dispenses the new liquid into container or containers 4 until the previous liquid has been substantially completely rinsed out. The overflowing liquid is preferably collected in a container.

The individual embodiments of emptying device 23 and of the emptying method can be combined in any manner to the extent deemed useful by one skilled in the art.

What is claimed is:

1. An apparatus for processing a tissue sample, the tissue sample being received by a cassette having a cassette frame and a tissue holder coupled to the cassette frame, the tissue sample being held in the tissue holder during processing by the apparatus, wherein the apparatus comprises:
   a dispensing device including a plurality of dispensing vessels each having a respective exit nozzle, the plurality of dispensing vessels respectively containing a plurality of liquid chemical substances, wherein one of the plurality of liquid chemical substances is a liquid chemical for dehydrating the tissue sample and another of the plurality of liquid chemical substances is liquid wax, wherein the dispensing device is automatically operable to dispense the liquid chemical substance from a selected one of the plurality of dispensing vessels by way of the exit nozzle of the selected dispensing vessel;
   a container for holding liquid, wherein the container is configured to engage the cassette frame to hold the cassette in a fixed position relative to the container such that the tissue holder is received in the container, wherein the container includes a heating device automatically operable to heat the container;
   emptying means for emptying liquid out of the container; and
   a control unit connected to the dispensing device, the heating device, and the emptying means;
   wherein the dispensing device is displaceable in a horizontal direction to a dispensing position above the container in which the respective exit nozzles of the plurality of dispensing vessels are directly above the container;
   wherein the control unit is configured to control the dispensing device to dispense a selected one of the plurality of liquid chemical substances from the respective exit nozzle of one of the plurality of dispensing vessels such that the selected one of the plurality of liquid chemical substances drops down directly into the container by force of gravity when the dispensing device is in the dispensing position to submerge and infiltrate the tissue sample;
   wherein the control unit is configured to control the emptying means when the dispensed liquid chemical substance is the liquid chemical for dehydrating the tissue sample to empty the dispensed liquid chemical substance from the container after a first delay time period has elapsed;
   wherein the control unit is configured to control the heating device when the dispensed liquid chemical substance is liquid wax to maintain the liquid wax in a liquid state in the container for a second delay time period before turning the heating device off.

2. The apparatus according to claim 1, wherein the apparatus comprises several containers each configured to hold one single tissue sample, and the dispensing device is displaceable in the horizontal direction from the dispensing position above one of the several containers to the dispensing position above another of the several containers.

3. The apparatus according to claim 1, wherein the plurality of dispensing vessels of the dispensing are integrated into one common cartridge.

4. The apparatus according to claim 1, wherein the dispensing device includes a heating apparatus for heating at least one of the plurality of dispensing vessels.

5. The apparatus according to claim 1, wherein the apparatus comprises a camera that can read a code present on the cassette, and the control unit is configured to execute an individual dehydration protocol as a function of information contained in the code.

6. An apparatus for processing a tissue sample, the tissue sample being received by a cassette having a cassette frame and a tissue holder coupled to the cassette frame, the tissue sample being held in the tissue holder during processing by the apparatus, wherein the apparatus comprises:
   a dispensing device including a plurality of dispensing vessels each having a respective exit nozzle, the plurality of dispensing vessels respectively containing a plurality of liquid chemical substances, wherein one of the plurality of liquid chemical substances is a liquid chemical for dehydrating the tissue sample and another of the plurality of liquid chemical substances is liquid wax, wherein the dispensing device is automatically operable to dispense the liquid chemical substance from a selected one of the plurality of dispensing vessels by way of the exit nozzle of the selected dispensing vessel;
   a container for holding liquid, wherein the container is configured to engage the cassette frame to hold the cassette in a fixed position relative to the container such that the tissue holder is received in the container, wherein the container includes a heating device automatically operable to heat the container;
   emptying means for emptying liquid out of the container; and
   a control unit connected to the dispensing device, the heating device, and the emptying means;
   wherein the dispensing device is displaceable in a horizontal direction to a dispensing position above the container in which the respective exit nozzles of the plurality of dispensing vessels are directly above the container;
   wherein the control unit is configured to control the dispensing device to dispense a selected one of the plurality of liquid chemical substances into the container when the dispensing device is in the dispensing position to submerge and infiltrate the tissue sample;
   wherein the control unit is configured to control the emptying means when the dispensed liquid chemical substance is the liquid chemical for dehydrating the tissue sample to empty the dispensed liquid chemical substance from the container after a first delay time period has elapsed;
   wherein the control unit is configured to control the heating device when the dispensed liquid chemical substance is liquid wax to maintain the liquid wax in a liquid state in the container for a second delay time period before turning the heating device off;

wherein the apparatus comprises several containers each configured to hold one single tissue sample, and the dispensing device is displaceable in the horizontal direction from the dispensing position above one of the several containers to the dispensing position above another of the several containers;

wherein the several containers are mounted on a shaft, wherein the several containers are pivotable together around the shaft to simultaneously empty liquid out of the several containers.

7. A method for processing a tissue sample, comprising the following steps:
(A) placing several tissue samples into several containers, each one of the tissue samples being respectively placed into a different respective one of the several containers;
(B) providing a dispensing device including a plurality of dispensing vessels each having a respective exit nozzle, the plurality of dispensing vessels respectively containing a plurality of liquid chemical substances, wherein at least one of the plurality of liquid chemical substances is a liquid chemical for dehydrating the tissue sample and another of the plurality of liquid chemical substances is liquid wax, wherein the dispensing device is automatically operable to dispense the liquid chemical substance from a selected one of the plurality of dispensing vessels by way of the exit nozzle of the selected dispensing vessel;
(C) positioning the dispensing device at a dispensing position above a first container of the several containers such that the respective exit nozzles of the plurality of dispensing vessels are directly above the first container;
(D) automatically controlling the dispensing device to dispense at least one liquid chemical for dehydrating the tissue sample into the first container to submerge and infiltrate the tissue sample in the first container;
(E) automatically emptying the at least one liquid chemical for dehydrating the tissue sample from the first container after a first delay time period has elapsed;
(F) automatically controlling the dispensing device to dispense the liquid wax into the first container to submerge and infiltrate the tissue sample in the first container; and
(G) automatically controlling a heating device associated with the first container to maintain the liquid wax dispensed into the first container in a liquid state in the first container for a second delay time period before turning the heating device off.

8. The method according to claim 7, wherein:
the steps (C) and (D) are repeated with respect to at least a second container of the several containers to submerge and infiltrate the tissue sample in the second container prior to execution of steps (E) and (F), wherein the dispensing device is automatically displaced in a horizontal direction to position the dispensing device at a dispensing position above the second container; and
the steps (E) and (F) are repeated with respect to at least the second container of the several containers to submerge and infiltrate the tissue sample in the second container, wherein the dispensing device is automatically displaced in the horizontal direction to position the dispensing device at the dispensing position above the second container.

9. The method according to claim 8, wherein step (E) is performed simultaneously with respect to the first container and the second container.

10. A method for processing a tissue sample, comprising the following steps:
placing several tissue samples into several containers, each one of the tissue samples being respectively placed into a different respective one of the several containers;
providing a dispensing device including a plurality of dispensing vessels each containing a liquid chemical substance and each having a respective exit nozzle, wherein the dispensing device is automatically operable to dispense the liquid chemical substance from a selected one of the plurality of dispensing vessels by way of the exit nozzle of the selected dispensing vessel;
controlling the dispensing device to automatically dispense at least one liquid chemical substance into each of the several containers, wherein the dispensing device is automatically displaced in a horizontal direction to successively position the dispensing device at a respective dispensing position above each one of the several containers wherein the respective exit nozzles of the plurality of dispensing vessels are directly above one of the several containers to dispense the at least one liquid chemical substance into the container below; and
automatically emptying the several containers of the at least one chemical substance therein.

11. The method according to claim 10, wherein the several containers are automatically emptied simultaneously.

* * * * *